US010066709B2

(12) United States Patent
Greer et al.

(10) Patent No.: US 10,066,709 B2
(45) Date of Patent: Sep. 4, 2018

(54) MOUNTING ALIGNMENT SYSTEM

(71) Applicant: FNA Group, Inc., Pleasant Prairie, WI (US)

(72) Inventors: Alan Michael Greer, Rogers, AR (US); Bradley Kent Daniel, Bentonville, AR (US); Gus Alexander, Inverness, IL (US)

(73) Assignee: FNA Group, Inc., Pleasant Prairie, WI (US)

( * ) Notice: Subject to any disclaimer, the term of this patent is extended or adjusted under 35 U.S.C. 154(b) by 0 days.

(21) Appl. No.: 15/297,201

(22) Filed: Oct. 19, 2016

(65) Prior Publication Data

US 2017/0108094 A1    Apr. 20, 2017

Related U.S. Application Data

(60) Provisional application No. 62/243,471, filed on Oct. 19, 2015.

(51) Int. Cl.
| F16H 7/14 | (2006.01) |
| F16H 7/02 | (2006.01) |
| F16H 7/08 | (2006.01) |

(52) U.S. Cl.
CPC .............. F16H 7/14 (2013.01); F16H 7/02 (2013.01); *F16H 2007/0842* (2013.01); *F16H 2007/0865* (2013.01); *F16H 2007/0891* (2013.01)

(58) Field of Classification Search
CPC ..... F16H 7/14; F16H 2007/0842; F16M 7/00; F16C 29/04

USPC .................................................. 474/113, 114
See application file for complete search history.

(56) References Cited

U.S. PATENT DOCUMENTS

| 1,511,336 | A | * | 10/1924 | Hoey | F16M 7/00 16/DIG. 39 |
| 1,756,515 | A | * | 4/1930 | Hulsey | F16M 7/00 248/657 |
| 1,878,983 | A | * | 9/1932 | Harris | H02K 5/26 248/657 |
| 1,935,878 | A | * | 11/1933 | Hamerstadt | F16H 7/14 248/656 |
| 1,982,682 | A | * | 12/1934 | Hormisdas | H02K 5/26 248/662 |
| 2,062,128 | A | * | 11/1936 | Hamerstadt | F16H 7/14 248/665 |
| 2,184,541 | A | * | 12/1939 | Aikman | F16H 7/14 248/656 |

(Continued)

*Primary Examiner* — Henry Y Liu
(74) *Attorney, Agent, or Firm* — Jeffrey T. Placker; Steven E. Jedlinski; Holland & Knight LLP

(57) ABSTRACT

A mounting alignment apparatus may include a rail assembly including a first pair of alignment surfaces. The mounting alignment apparatus may also include a slide assembly including a second pair of alignment surfaces. The first and second pairs of alignment surfaces may define an interacting capturing geometry therebetween, permitting sliding movement of the slide assembly relative to the rail assembly along a first axis, and restricting movement of the slide assembly relative to the rail assembly about an axis other than the first axis. The mounting alignment apparatus may also include a tension adjustment assembly coupled between the rail assembly and the slide assembly for positioning the slide assembly relative to the rail assembly along the first axis.

20 Claims, 13 Drawing Sheets

(56) References Cited

U.S. PATENT DOCUMENTS

| | | | | |
|---|---|---|---|---|
| 2,210,135 A * | 8/1940 | Tauts | ............... | F16P 1/02 |
| | | | | 144/251.2 |
| 2,594,674 A * | 4/1952 | Nietfeld | ............... | F16H 7/14 |
| | | | | 248/655 |
| 2,640,367 A * | 6/1953 | Rieser | ............... | F16H 57/025 |
| | | | | 248/652 |
| 2,643,551 A * | 6/1953 | Russell | ............... | F16H 7/14 |
| | | | | 474/114 |
| 2,762,662 A * | 9/1956 | Sloyan | ............... | F16H 7/14 |
| | | | | 248/657 |
| 2,762,663 A * | 9/1956 | Sloyan | ............... | B41J 11/22 |
| | | | | 248/657 |
| 2,833,597 A * | 5/1958 | Sloyan | ............... | F16C 29/00 |
| | | | | 248/657 |
| 2,833,598 A * | 5/1958 | Sloyan | ............... | F16C 29/04 |
| | | | | 248/657 |
| 2,874,006 A * | 2/1959 | Sloyan | ............... | F16H 7/14 |
| | | | | 384/29 |
| 3,027,736 A * | 4/1962 | Smith | ............... | F24F 1/02 |
| | | | | 248/666 |
| 3,066,898 A * | 12/1962 | Haynes | ............... | F16M 7/00 |
| | | | | 211/182 |
| 3,421,724 A * | 1/1969 | Cornell | ............... | F16M 7/00 |
| | | | | 248/657 |
| 3,494,208 A * | 2/1970 | Alagna | ............... | B65G 23/08 |
| | | | | 474/114 |
| 3,586,273 A * | 6/1971 | Sloyan | ............... | F16M 7/00 |
| | | | | 248/657 |
| 3,814,358 A * | 6/1974 | Sloyan | ............... | F16H 3/00 |
| | | | | 248/655 |
| 3,872,801 A * | 3/1975 | Weddendorf | ............... | A47F 10/06 |
| | | | | 186/57 |
| 3,908,941 A * | 9/1975 | Bromley | ............... | F16M 7/00 |
| | | | | 248/657 |
| 4,252,380 A * | 2/1981 | Sloyan | ............... | F16C 29/02 |
| | | | | 248/657 |
| 4,344,598 A * | 8/1982 | Sloyan | ............... | F16M 7/00 |
| | | | | 248/651 |
| 4,502,846 A * | 3/1985 | Cavanna | ............... | F16M 7/00 |
| | | | | 248/657 |
| 4,561,624 A * | 12/1985 | Freeman | ............... | F16H 7/14 |
| | | | | 248/149 |
| 4,631,044 A * | 12/1986 | Redmon | ............... | F16H 7/02 |
| | | | | 248/656 |
| 4,865,289 A * | 9/1989 | Lawson | ............... | F16H 7/14 |
| | | | | 248/220.21 |
| 4,889,519 A * | 12/1989 | Band | ............... | G01B 5/0002 |
| | | | | 474/101 |
| 4,922,151 A * | 5/1990 | Lewis | ............... | D06F 37/206 |
| | | | | 310/91 |
| 6,705,581 B2 * | 3/2004 | Trago | ............... | F16H 7/14 |
| | | | | 248/656 |
| 7,338,400 B2 * | 3/2008 | Pierjok | ............... | F16H 7/14 |
| | | | | 417/359 |
| 7,927,081 B2 * | 4/2011 | MacNeil | ............... | F04B 17/03 |
| | | | | 417/361 |
| 8,523,721 B2 * | 9/2013 | Marica | ............... | F16H 7/14 |
| | | | | 474/114 |
| 8,910,917 B1 * | 12/2014 | Bees | ............... | F16M 7/00 |
| | | | | 248/657 |
| 9,476,244 B2 * | 10/2016 | Miller | ............... | E05F 15/643 |
| 9,803,726 B2 * | 10/2017 | Lindsay | ............... | F16H 7/14 |
| 9,806,583 B2 * | 10/2017 | Norris | ............... | H02K 5/26 |
| 2003/0192776 A1 * | 10/2003 | Sousek | ............... | F16H 7/1209 |
| | | | | 198/814 |
| 2007/0142147 A1 * | 6/2007 | Thornton | ............... | B23D 47/12 |
| | | | | 474/117 |
| 2009/0191069 A1 * | 7/2009 | Dubensky | ............... | F04B 35/01 |
| | | | | 417/359 |
| 2011/0165980 A1 * | 7/2011 | Hoeting | ............... | F16H 7/14 |
| | | | | 474/114 |

* cited by examiner

MOUNTING ALIGNMENT SYSTEM

CROSS-REFERENCE TO RELATED APPLICATION

This application claims the benefit of U.S. provisional patent application Ser. No. 62/243,471, entitled "Mounting Alignment System," filed on Oct. 19, 2015, the entire disclosure of which is incorporated herein by reference.

TECHNICAL FIELD

The present invention generally relates to mounting systems for belt driven machines, and more particularly relates to mounting systems for belt driven machines that facilitate alignment and tensioning of the drive belt therefor.

BACKGROUND

Many different systems utilize belts for transmitting rotational power between components. Often, achieving, and maintaining, the proper belt tension may be important to the efficiency of the system. For example, too little belt tension may result in slippage of belt around one or more of the pulleys in the system, Such slippage may not only result in inefficient power transmission, but may also result in premature wear and failure of components, such as wear on the belt and overheating of the pulleys due to the sliding friction of the belt. Similarly, too much tension may increase the friction experienced by the individual rotating components, resulting in inefficient power transfer, as power may be lost due to the excessive friction. Additionally, the excessive load resulting from an overly tight belt may cause premature wear and failure of items, such as bearings or bushings. Often tensioning belts in such systems requires loosening pivot bolts and locking bolts of one of the belt driven components. Once the pivot and locking bolts have been loosened, the belt driven component must be levered around the pivot bolt to obtain the desired belt tension. While the belt driven component is held in position to provide the desired belt tension, the pivot bolts and locking bolts must be tightened to lock the belt driven component in the position providing the desired belt tension. However, it may often be difficult to perform these operations without changing the belt tension, especially when the belt driven component is located in a confined space. Other systems for adjusting belt tension may often present similar challenges. As a result, achieving and maintaining a desired belt tension can often be challenging, and inexact.

SUMMARY

According to a first implementation, a mounting alignment apparatus may include a rail assembly including a first pair of alignment surfaces. The mounting alignment apparatus may also include a slide assembly including a second pair of alignment surfaces. The first and second pairs of alignment surfaces may define an interacting capturing geometry therebetween permitting sliding movement of the slide assembly relative to the rail assembly along a first axis, and restricting movement of the slide assembly relative to the rail assembly about an axis other than the first axis. The mounting alignment apparatus may also include tension adjustment assembly coupled between the rail assembly and the slide assembly for positioning the slide assembly relative to the rail assembly along the first axis.

One or more of the following features may be included. The first pair of alignment surfaces may include a two opposed upwardly diverging sidewalls. The second pair of alignment surfaces may include two opposed downwardly converging sidewalls disposed proximate to, and outside of, the first pair of alignment surfaces. The first pair of alignment surfaces may include two opposed upwardly converging sidewalls. The second pair of alignment surfaces may include two opposed downwardly diverging sidewalls disposed proximate to, and inside of, the first pair of alignment surfaces. One of the first pair of alignment surfaces and the second pair of alignment surfaces may define a channel extending along the first axis. The other of the first pair of alignment surfaces and the second pair of alignment surfaces may define a protrusion extending into the channel.

The tension adjustment assembly may include a threaded nut engaged with one of the rail assembly and the slide assembly and a threaded rod engaged with the other of the rail assembly and the slide assembly. The threaded rod may be threadably engageable with the nut to move the rail assembly and the slide assembly relative to one another upon rotation of at least one of the threaded nut and the threaded rod. The threaded rod may include a bolt received through an upstanding tab of the rail assembly, and the threaded nut may be coupled to a downwardly extending tab of the slide assembly. The nut may include a locking nut. The tension adjustment assembly may include a pin extending through an opening in the slide assembly and one or more openings in the rail assembly. The one or more openings may extend along the first axis and may be configured to receive at least a portion of the pin to retain the rail assembly and the slide assembly relative to one another in one or more positions along the first axis. The pin may include a spring loaded pin biasing the pin toward engagement with the one or more openings in the rail assembly.

One or more of the rail assembly and the slide assembly may include stamped sheet metal components. The tension adjustment assembly may be generally centrally oriented relative to the first and second pairs of alignment surfaces. The tension adjustment assembly may be offset relative to the first and second pairs of alignment surfaces.

According to another implementation, a system may include a support frame. The system may also include a first belt driven machine mounted to the support frame. The first belt driven machine may include a first pulley. The system may also include a second belt driven machine mounted to a mounting alignment apparatus. The second belt driven machine may include a second pulley rotatably coupled to the first pulley by a belt. The mounting alignment apparatus may include a rail assembly including a first pair of alignment surfaces. The mounting alignment apparatus may also include a slide assembly including a second pair of alignment surfaces. The first and second pairs of alignment surfaces may define an interacting capturing geometry therebetween permitting sliding movement of the slide assembly relative to the rail assembly along a first axis parallel to a plane of the belt, and restricting movement of the slide assembly relative to the rail assembly about an axis other than the first axis. The mounting alignment apparatus may also include a tension adjustment assembly coupled between the rail assembly and the slide assembly for adjusting a tension of the belt by positioning the slide assembly relative to the rail assembly along the first axis.

One or more of the following features may be included. The first belt driven machine may include a prime mover and the second belt driven machine includes a belt driven accessory receiving driving power from the prime mover via the belt. The second belt driven machine may include a pump. The tension adjustment assembly may include a bolt extending through an upstanding tab of the rail assembly and threadably engaging a locking nut affixed to a downwardly extending tab of the slide assembly. The first and second pairs of alignment surfaces may define complimentary interacting capturing geometries.

According to yet another implementation, a system may include a frame assembly. A rail assembly may be attached to the frame assembly. The rail assembly comprising a first pair of alignment surfaces. A slide assembly may include a second pair of alignment surfaces. The first and second pairs of alignment surfaces may define an interacting capturing geometry therebetween permitting sliding movement of the slide assembly relative to the rail assembly along a first axis, and restricting movement of the slide assembly relative to the rail assembly about an axis other than the first axis.

One or more of the following features may be included. The first pair of alignment surfaces may include a two opposed upwardly diverging sidewalls. The second pair of alignment surfaces may include two opposed downwardly converging sidewalls disposed proximate to, and outside of, the first pair of alignment surfaces. The frame assembly may include a cabinet, and the first axis may be perpendicular to a plane of a face of the cabinet.

DETAILED DESCRIPTION OF ILLUSTRATIVE EMBODIMENTS

In general, the present disclosure may provide a mounting alignment system. In an illustrative example embodiment, the mounting alignment system may be utilized for mounting one belt driven machine relative to another belt driven machine, and may facilitate alignment therebetween, as well as facilitate controlling the tensioning of the belt or chain coupling the two (or more) belt driven machines. As used herein, a belt driven machine may include any belt driven, or belt driving, machine, apparatus, or component. Examples of belt driven machines may include, but are not limited to, a prime mover (e.g., an electric motor, a gas engine, or the like), a pump, a transmission, an alternator/generator, an idler wheel, or the like, which may provide, or receive, a rotating driving force via a pulley, sprocket, or the like, for transmitting power via a belt, chain, or similar power transmission component. Consistent with the present disclosure, the mounting alignment system may include a rail assembly and a slide assembly, which may be slidingly coupled by respective alignment surfaces which may be arranged in complementary interacting and capturing geometries. The complementary interacting capturing geometries may allow the rail assembly and the slide assembly to move relative to one another along a first axis, which resisting, or restricting, other movement relative to each other, including other sliding movement, rotating movement, and translating movement. In a particular arrangement, the first axis may generally be aligned with a plane of the pulleys of the first and second belt driven machines. As such, when one of the belt driven machines is coupled to the mounting alignment apparatus, movement of the rail assembly and the slide assembly relative to one another may control a tension of a common belt, e.g., without disturbing the alignment of the belt relative to the respective pulleys of each belt driven machine. Further, the mounting alignment apparatus may include a tensioning assembly, e.g., which may generally control the relative position of the rail assembly and the slide assembly along the first axis.

Figure 1:
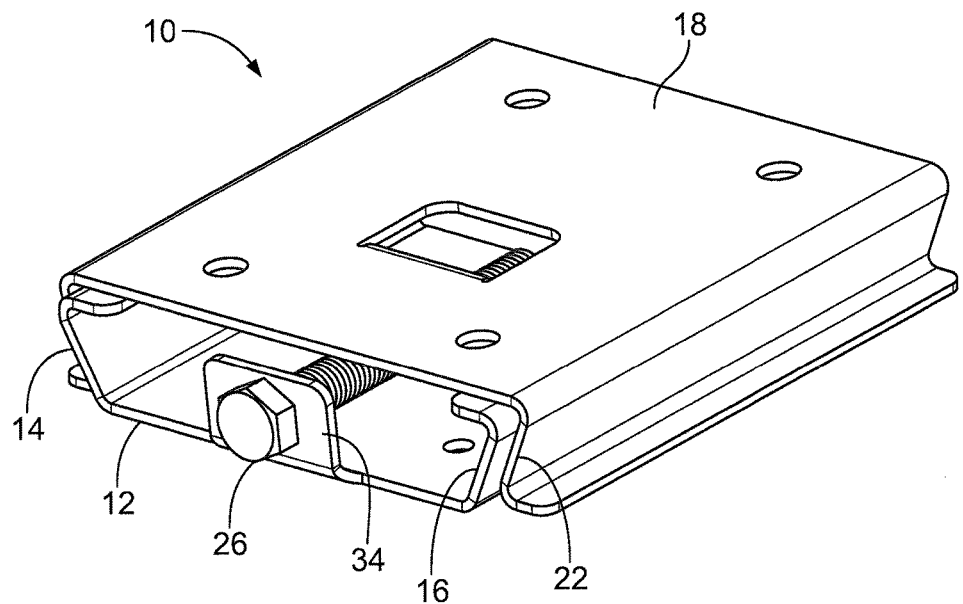
FIG. 1 depicts a perspective view of a mounting alignment apparatus, according to an example embodiment.
Figure 2:
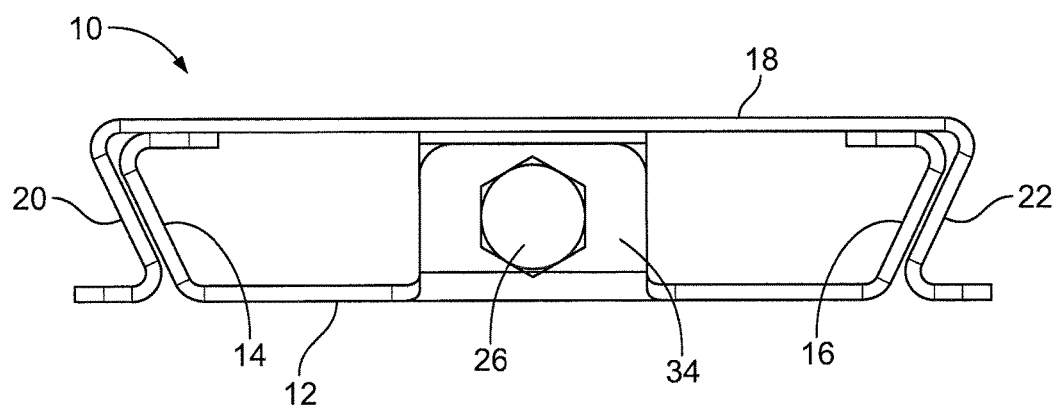
FIG. 2 depicts an end view of the example embodiment of a mounting alignment apparatus of FIG. 1.
Figure 3:
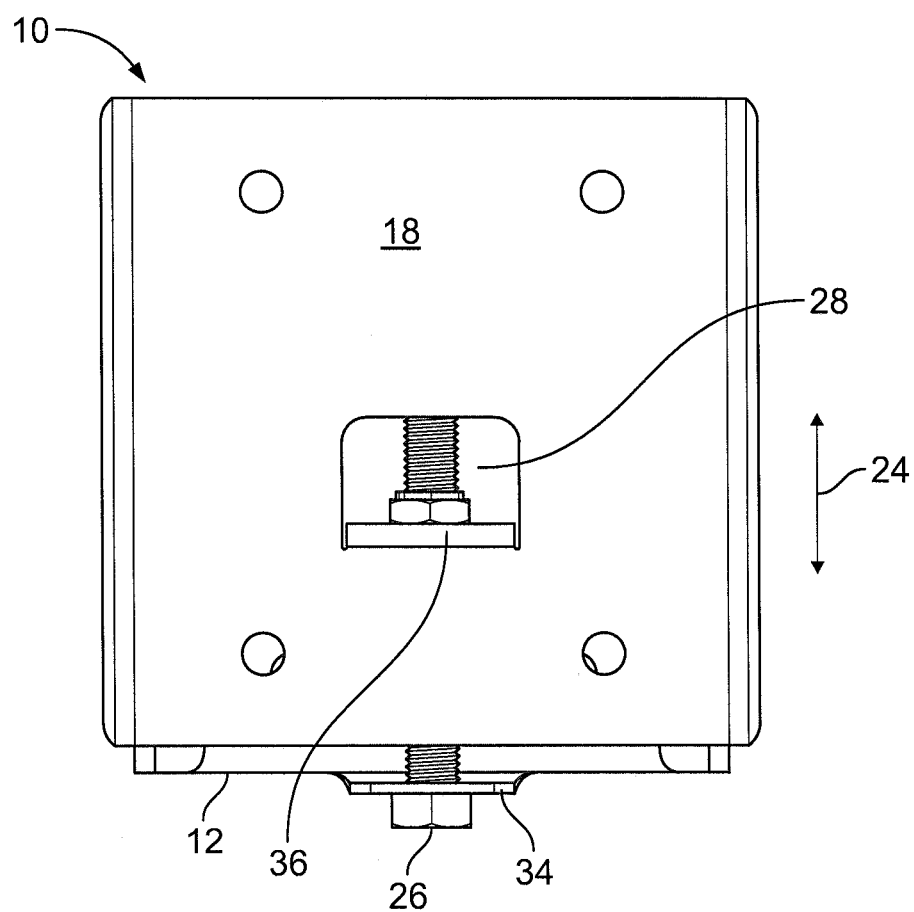
FIG. 3 depicts a top plan view of the example embodiment of a mounting alignment apparatus of FIG. 1.

For example, and referring also to FIGS. 1-3, and illustrative example of an embodiment of a mounting alignment apparatus 10 is depicted. As shown, the mounting alignment apparatus may generally include a rail assembly 12, including a first pair of alignment surfaces 14, 16. The mounting alignment apparatus 10 may also include a slide assembly 18 including a second pair of alignment surfaces 20, 22. It will be appreciated that which the first and second pair of alignment surfaces 14, 16, 20, 22 are generally designated by as the sidewall components of the rail assembly 12 and the slide assembly 18, the first and second pair of alignment surfaces 14, 16, 20, 22 may generally include the interacting surfaces thereof. Further, consistent with the illustrated example embodiment, the first and second pairs of alignment surfaces 14, 16, 20, 22 may define an interacting capturing geometry therebetween permitting sliding movement of the slide assembly 18 relative to the rail assembly 12 along a first axis (e.g., as generally designated as axis 24 in FIG. 3), based upon the geometric constraints of the interacting capturing geometries of the first and second pair of alignment surfaces 14, 16, 20, 22. Further, the first and second pairs of alignment surfaces 14, 16, 20, 22 may restrict movement of the slide assembly 18 relative to the rail assembly 12 about an axis other than the first axis. The restriction of movement of the slide assembly 18 relative to the rail assembly 12 may include restriction of sliding movement, translational movement, and rotational movement (including, in some embodiments, rotational movement about the first axis). Additionally, the mounting alignment apparatus 10 may also include tension adjustment assembly (e.g., generally indicated by bolt 26 and nut 28, although other tensioning assemblies may be utilized, as discussed herein) coupled between the rail assembly 12 and the slide assembly 18 for positioning the slide assembly 18 relative to the rail assembly 12 along the first axis 24.

As generally discussed above, in an embodiment, a belt driven machine (e.g., such as a pump, etc.) may be attached to the mounting alignment apparatus 10. Further, the mounting alignment apparatus 10 may be affixed to a mounting structure, or frame. When another belt driven machine (e.g., such as a motor, etc.) is attached to the mounting structure, or frame, the mounting alignment apparatus 10 may allow the belt driven machine to remain in constant alignment (e.g., about the first axis 24) with the other belt driven machine. For example the pulleys of the two belt driven machines may be aligned with one another (e.g., by being positioned in a common plane). The initial alignment of the two belt driven machines may be achieved, e.g., through one or more of adjusting the alignment of the belt driven machine attached to the mounting structure or frame, adjusting the alignment of the mounting alignment apparatus 10 relative to the mounting structure or frame, and/or adjusting the alignment of the belt driven machine attached to the mounting alignment apparatus 10. Once a desired initial alignment between the two belt driven machines has been achieve (e.g., such that the first axis 24 of the mounting alignment apparatus 10 is parallel with the plane of the pulleys of the two belt driven machines), the tension of the belt coupling the two belt driven machines may be adjusted by moving the slide assembly 18 (and therein the belt driven machine attached to the slide assembly) relative to the rail assembly 12 (and therein the second belt driven machine, e.g., which may be mounted in a fixed relationship to the rail assembly 12, such as via the mounting structure, or frame) without compromising the alignment between the two belt driven machines (e.g., by virtue of the first and second pairs of alignment surfaces 14, 16, 20, 22 resisting movement of the slide assembly 18 and the rail assembly 14 other slidingly along the first axis 24).

Figure 4:
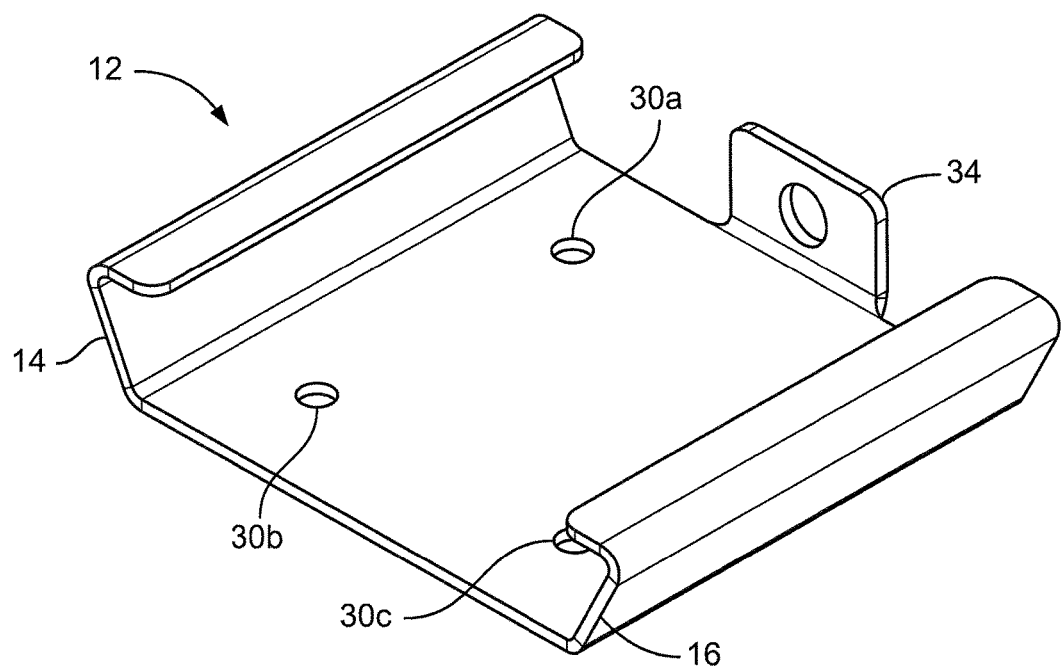
FIG. 4 depicts a perspective view of a rail assembly of the example embodiment of a mounting alignment apparatus of FIG. 1.
Figure 5:
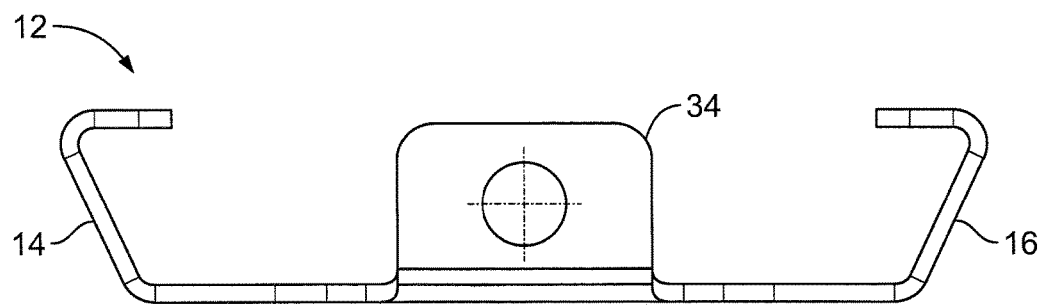
FIG. 5 depicts an end view of the example embodiment of a rail assembly of FIG. 4.

Referring also to FIGS. 4-5, an illustrative example of the rail assembly 12 is shown. As generally described above the rail assembly 12 may generally include a first pair of alignment surfaces 14, 16. Additionally, the rail assembly 12 may include mounting features (such as mounting holes 30a-30c), which may allow the rail assembly 12 to attached to a support structure, or frame (e.g., using appropriate bolts or other fasteners). It will be appreciated that additional and/or alternative techniques may be used for attaching the rail assembly 12 to a mounting structure or frame. Additionally, while the rail assembly 12 has been shown as a single component, e.g., in which the first pair of alignment surfaces 14, 16 may be features of a common structure, it will be appreciated that in other embodiments the first pair of alignment surfaces may include separate components, e.g., which may be individually attached to a mounting structure or frame.

Figure 6:
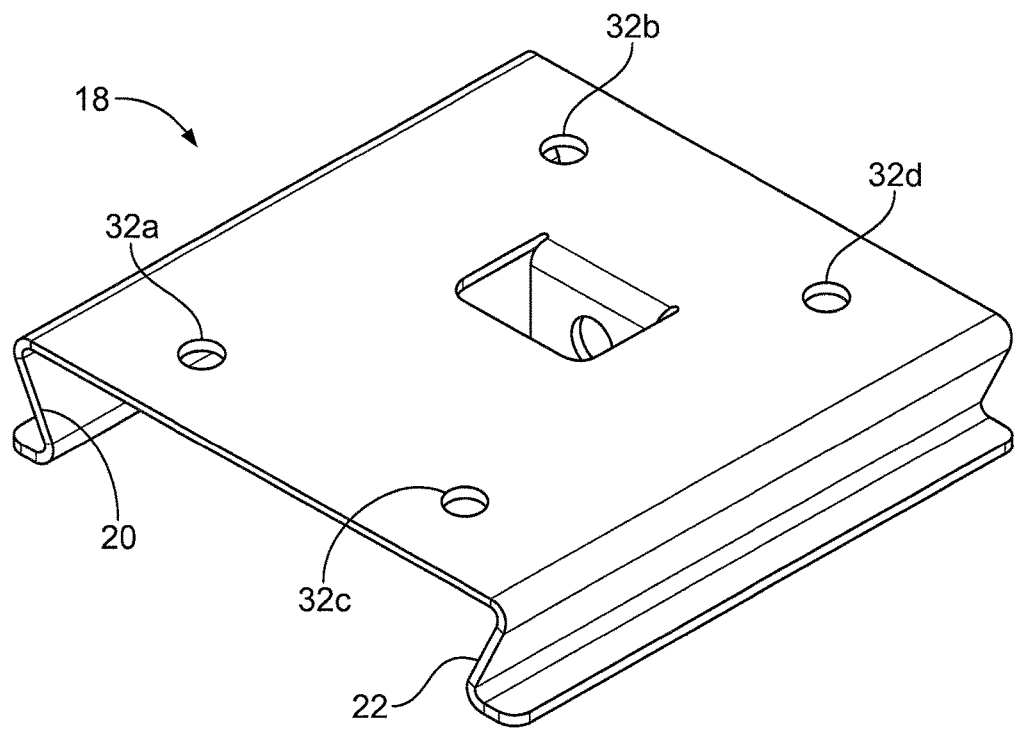
FIG. 6 depicts a perspective view of a slide assembly of a the example embodiment of a mounting alignment apparatus of FIG. 1.
Figure 7:
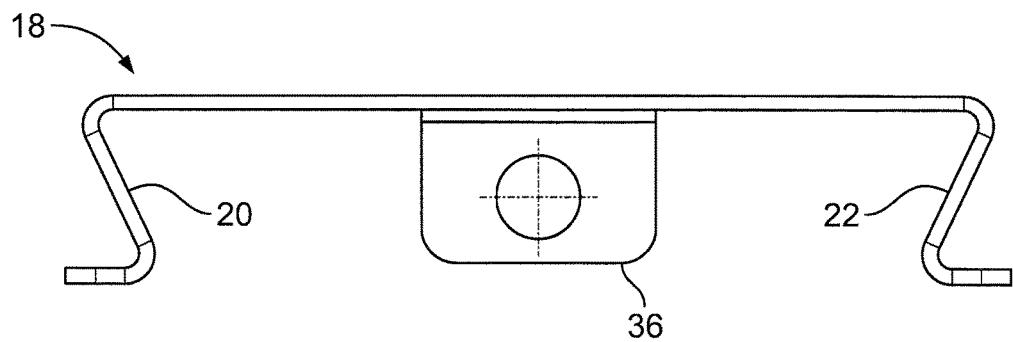
FIG. 7 depicts an end view of the example embodiment of a slide assembly of FIG. 6.

Referring also to FIGS. 6-7, an illustrative example of slide assembly 18 is shown. As generally described above, the slide assembly 18 may include a second pair of alignment surfaces 20, 22. Additionally, slide assembly 18 may include mounting features (such as holes 32a-d), which may allow a belt driven machine to be attached to the slide assembly 18 (e.g., using appropriate bolts or other fasteners, brackets, etc.). It will be appreciated that additional and/or alternative techniques may be used for attaching a belt driven machine to the slide assembly 18. Additionally, while the slide assembly 18 has been shown as a single component, e.g., in which the second pair of alignment surfaces 20, 22 may be features of a common structure, it will be appreciated that in other embodiments, the second pair of alignment surfaces may include separate components, e.g., which may be individually attached to a belt driven machine.

Consistent with the present disclosure, the first and second pairs of alignment surfaces 14, 16, 20, 22 may define an interacting capturing geometry therebetween permitting sliding movement of the slide assembly relative to the rail assembly along a first axis, and restricting movement of the slide assembly relative to the rail assembly about an axis other than the first axis (including rotational movement about the first axis). For example, when the first axis is oriented parallel to plane of the pulleys of two belt driven machines, the interacting alignment surfaces may prevent misalignment due to belt tension and the like. In some embodiments, the first and second pairs of alignment surfaces 14, 16, 20, 22 may provide a relatively smooth sliding movement therebetween. For example, the interfaces between the respective alignment surfaces may have a relatively smooth surface finish, may include a low friction bearing material, be amenable to lubrication, or the like.

As shown in the illustrated example embodiment, the first pair of alignment surfaces 14, 16 may include two opposed upwardly diverging sidewalls (e.g., sidewalls including alignment surfaces 14, 16, respectively. Correspondingly, the second pair of alignment surfaces 20, 22 may include two opposed downwardly converging sidewalls (e.g., sidewalls including alignment surfaces 20, 22, respectively). When the rail assembly 12 and the slide assembly 18 are assembled with one another, the second pair of alignment surfaces 20, 22 may be disposed proximate to, and outside of, the first pair of alignment surfaces 14, 16. The degree to which movement of the slide assembly 18 relative to the rail assembly 12 is restricted, other than sliding movement along the first axis 24, may depend, at least in part, upon the relative tolerances and separation between the respective alignment surfaces of the first and second pairs of alignment surfaces 14, 16, 20, 22. For example, if the first and second pairs of alignment surfaces 14, 16, 20, 22 are generally in contact with one another a relatively higher degree of resistance to movement, other than sliding along the first axis 24, may be observed as compared to a situation in which a relatively larger separation between respective interacting alignment surfaces is present.

While not illustrated, it will be appreciated that additional and/or alternative interacting complementary captured geometries may be utilized for the alignment surfaces. For example, the first pair of alignment surfaces (e.g., associated with the rail assembly) may include two opposed upwardly converging sidewalls, and the second pair of alignment surfaces (e.g., associated with the slide assembly) may include two opposed downwardly diverging sidewalls disposed proximate to, and inside of, the first pair of alignment surfaces. According to another example embodiment, one of the first pair of alignment surfaces and the second pair of alignment surfaces may define a channel (e.g., including any of a variety of cross-sections, such as hemispherical, square, trapezoidal, etc.) extending along the first axis. The other of the first pair of alignment surfaces and the second pair of alignment surfaces may define a protrusion extending into the channel. The protrusion may, in some embodiments have a generally complimentary cross-section as the channel, and/or may have another cross-section that may form an interacting capturing geometry with the channel. In another embodiment, one of the first and second pairs of alignment surfaces may include an inwardly extending lip, and the other of the first and second pairs of alignment surfaces may include an interacting outwardly extending lip, e.g., which may at least partially interlock with the inwardly extending lip. It will be appreciated that a variety of different geometries may be utilized to achieve an interacting capturing geometry that may permit sliding movement along the first axis and prevent movement other than the sliding movement along the first axis.

The mounting alignment apparatus may also include tension adjustment assembly coupled between the rail assembly and the slide assembly for positioning the slide assembly relative to the rail assembly along the first axis. For example, the tension adjustment assembly may retain the rail assembly and the slide assembly in one, or a plurality, of sliding positions along the first axis. Further, in some embodiments, the tension adjustment assembly may be configured to move and/or urge the rail assembly and the slide assembly toward a sliding position along the first axis. As such, the tension adjustment assembly may allow comparatively easy adjustment of the tension of a belt coupling two (or more) belt driven machines. A wide variety of mechanisms may be utilized for positioning the rail assembly and slide assembly relative to one another. Examples of such mechanisms may include, but are not limited, interacting threaded features, rack and pinion mechanisms, worm gear mechanisms, and the like.

Figure 8:
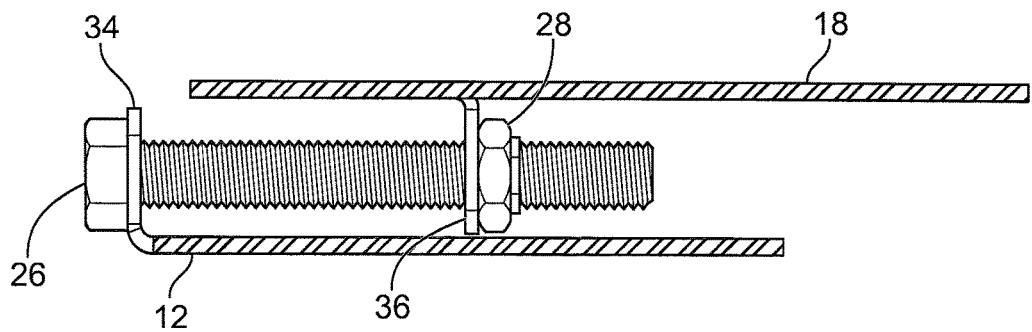
FIG. 8 is a cross-sectional view of the example embodiment of a mounting alignment apparatus of FIG. 1 depicting an example embodiment of a tension adjustment assembly.
Figure 9:
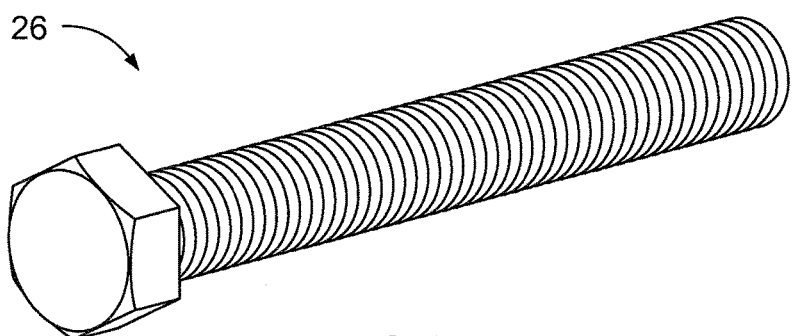
FIG. 9 depicts an example embodiment of a tension adjustment bolt of the tension adjustment assembly of FIG. 8.

As shown in FIGS. 1-3, and with additional reference to FIG. 8, in an illustrative example embodiment, the tension adjustment assembly may include a threaded nut 28 engaged with one of the rail assembly and the slide assembly (e.g., engaged with slide assembly 18 in the illustrated embodiment), and a threaded rod 26 engaged with the other of the rail assembly and the slide assembly (e.g., engaged with rail assembly 12 in the illustrated embodiment). For example, and as generally shown, the threaded rod 26 may be threadably engageable with the nut 28 to move the rail assembly 12 and the slide assembly 18 relative to one another upon rotation of at least one of the threaded rod 26 and the threaded nut 28. While it will be appreciated that other implementations may be equally utilized, in the specific illustrative example shown in the drawings, the threaded rod 26 may include a bolt 26 received through an upstanding tab 34 of the rail assembly 12, and the threaded nut 28 may be coupled to a downwardly extending tab 36 of the slide assembly 18. For example, the bolt 26 may be received through a hole in the upstanding tab 34 such that the head of the bolt may bear against an outer surface of the upstanding tab 34. Further, the bolt may extend through a hole in the downwardly extending tab 36, and may be threaded in to the nut 28, which may be positioned on the opposed side of the downwardly extending tab 36. As such, when the bolt 26 is tightened relative to the nut 28, a force may be exerted by the bolt head and the nut against the respective upstanding tab 34 and downwardly extending tab 36, thereby urging the tabs 34, 36 toward one another. The force urging the tabs 34, 36 toward one another may result in sliding movement of the rail assembly 12 and the slide assembly 18 relative to one another. While the tabs 34, 36 have generally been shown and described as being unitary features of the rail assembly 12 and the slide assembly 18, it will be appreciated that other arrangements may be utilized for affixing the components of the tension adjustment assembly to the rail assembly 12 and the slide assembly 18.

Consistent with the foregoing embodiment, when a belt driven machine is attached to the slide assembly 18 with the plane of the pulley being parallel to the first axis, tightening the bolt 26 relative to the nut 28 may move the slide assembly 18 relative to the rail assembly 12 so as to adjust the tension of a belt engaged with the pulley of the belt driven machine. As such, the tension of the belt may be adjusted by tightening or loosening the bolt relative to the nut. In an embodiment, one of the nut and the bolt may be fixed against rotation (e.g., by being tack welded to its respective tab, by a locking tab, or other suitable arrangement). As such, it may only be necessary to rotate one of the bolt and the nut. For example, the nut 28 may be tack welded to the downwardly extending tab 36. As such, the tension on the belt may be adjusted by turning the bolt 26. In this manner, the tension of the belt may be easily adjusted with a single wrench turning the bolt 26. It will be appreciated that other similar configurations may be utilized. In some embodiments, the mounting alignment apparatus 10 may be oriented relative to the first and second belt driven machine such that tightening the bolt 26 may serve to tighten the belt.

Figure 10:
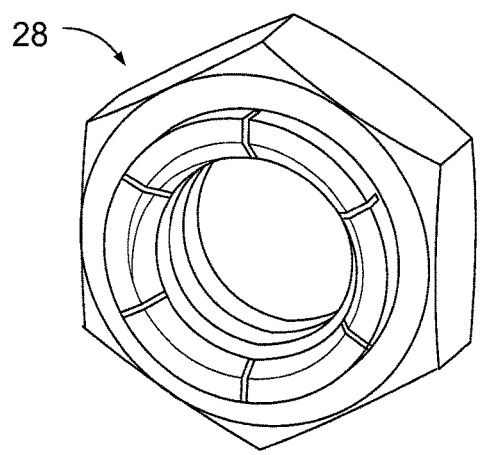
FIG. 10 depicts an example embodiment of a tension adjustment nut of the tension adjustment assembly of FIG. 8.

Referring also to FIG. 10, in an embodiment the nut 28 may include a locking nut. For example, the locking nut may resist movement of the bolt as a result of vibration. As such, utilizing a locking nut in connection with the tension adjustment assembly may resist changes in belt tension resulting from vibration imparted to the mounting alignment apparatus 10. It will be appreciated that a variety of locking nuts may be suitably utilized, such as a split beam locking nut, a nylon locking nut, or other similar locking nuts.

Figure 11:
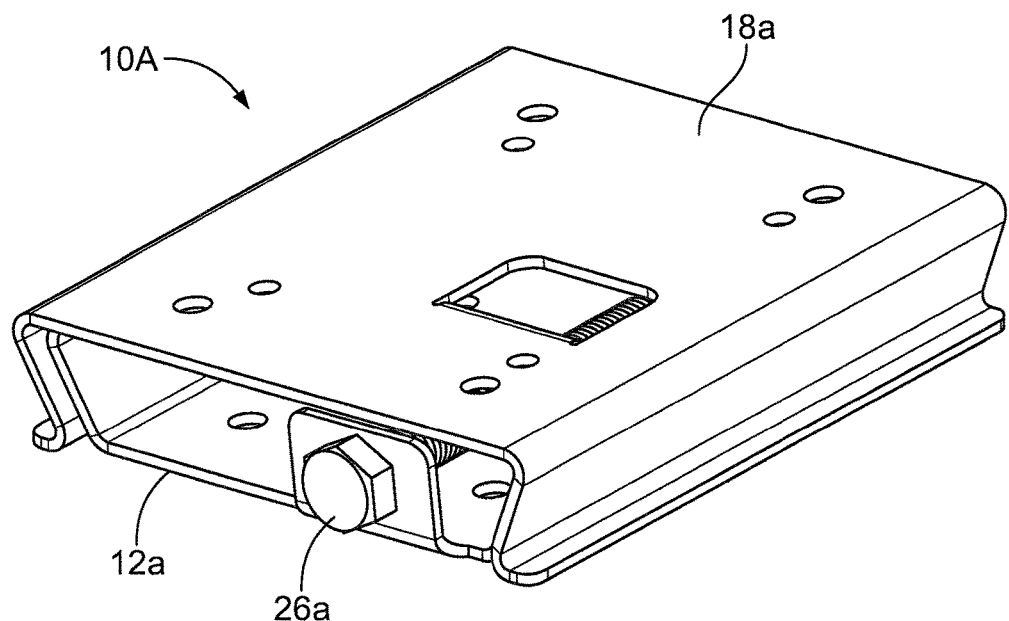
FIG. 11 depicts a perspective view of an example embodiment of a mounting alignment apparatus having an off-set tension adjustment assembly.
Figure 12:
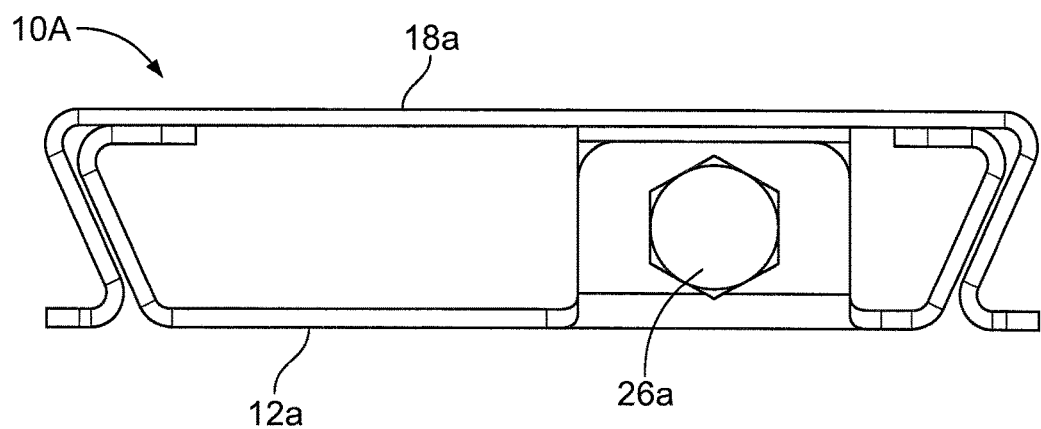
FIG. 12 is an end view of the example embodiment of a mounting alignment apparatus having an off-set tension adjustment assembly of FIG. 13.
Figure 13:
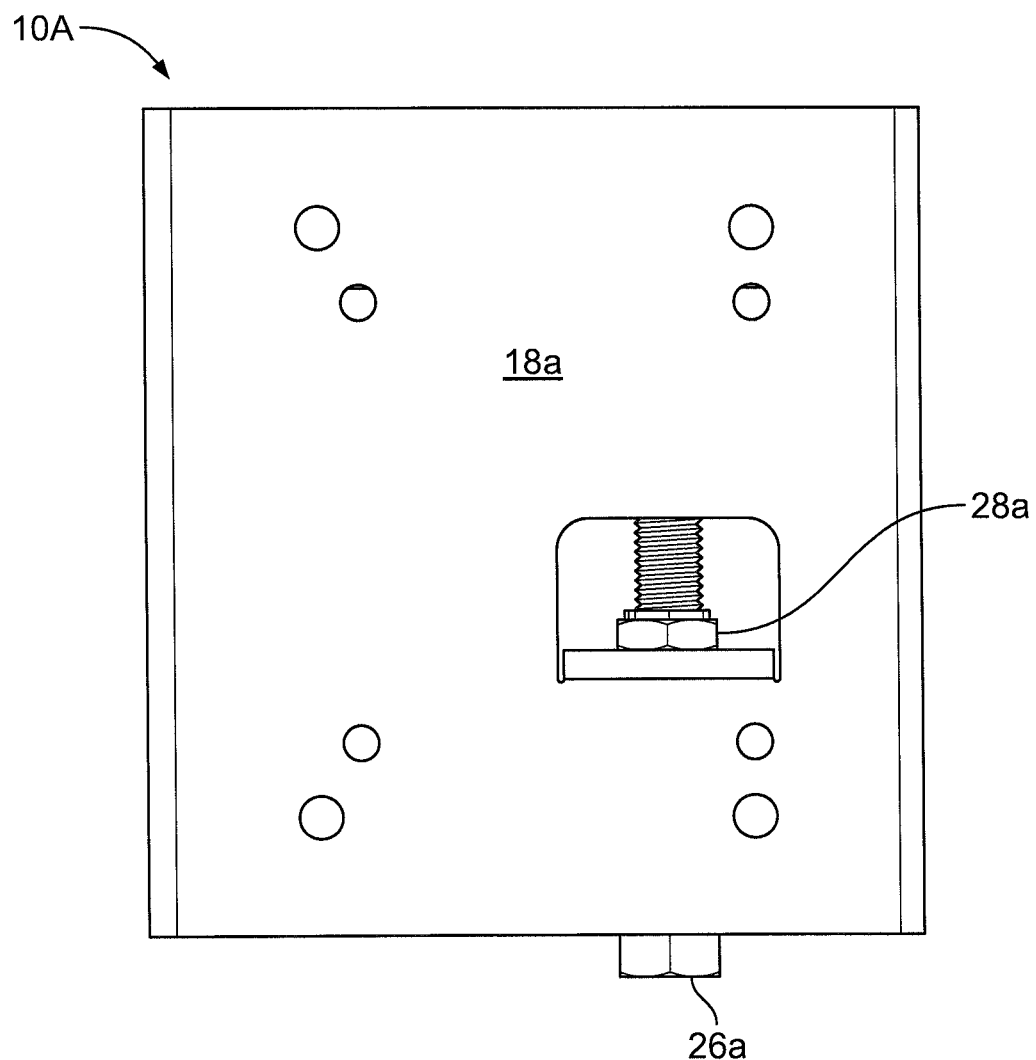
FIG. 13 is a top view of the example embodiment of a mounting alignment apparatus having an off-set tension adjustment assembly of FIG. 13.

In the foregoing illustrated embodiments, the tension adjustment assembly has been depicted as being generally centrally oriented relative to the first and second pairs of alignment surfaces. Consistent with such an embodiment, a tensioning force provided by the tension adjustment assembly may be generally evenly distributed between each alignment surface of the first pair of alignment surfaces and each alignment surface of the second pair of alignment surfaces. Referring also to FIGS. 11-13, in another illustrative example embodiment, the tension adjustment assembly may be offset relative to the first and second pairs of alignment surfaces. For example, in mounting alignment apparatus 10A the tension adjustment assembly may be laterally disposed closer to one set of interacting alignment surfaces, as compared to the other set of interacting alignment surfaces. In the illustrated example, bolt 26a and nut 28a may be disposed closer to the right hand alignment surfaces of rail assembly 12a and slide assembly 18a. In a configuration in which a belt driven machine is mounted to the slide assembly 18a with the pulley closer to the right hand side of the slide assembly 18a, positioning the tension adjustment assembly closer to the right hand side of the mounting alignment apparatus 10A may allow the tension adjustment assembly to act closer to the plane of the belt, which may, in some situations, provide some degree of countering of a torque about the belt driven machine imparted by the belt tension.

Figure 14A:
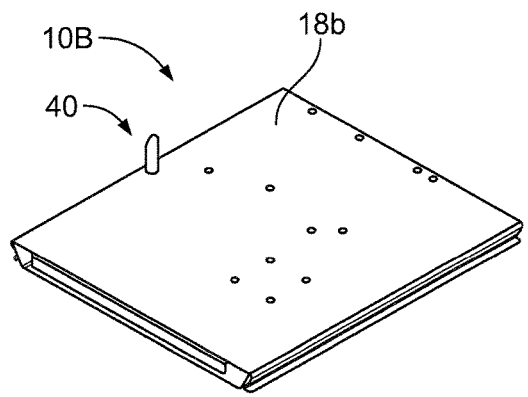
FIGS. 14A-14B depict a mounting alignment apparatus utilizing a pin tension adjustment assembly, according to an example embodiment, in an extended position and in a retracted position, respectively.
Figure 14B:
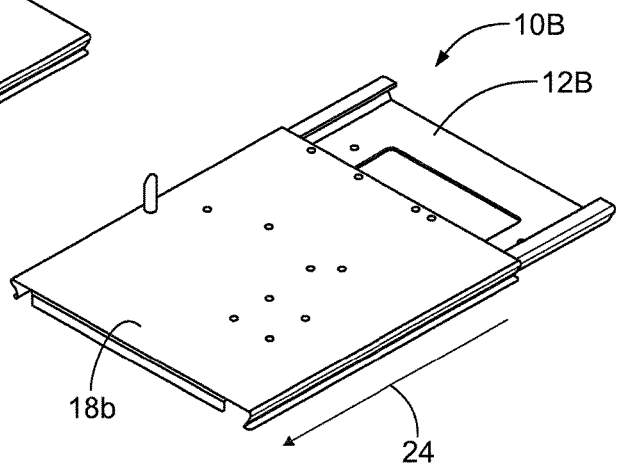
Figure 15:
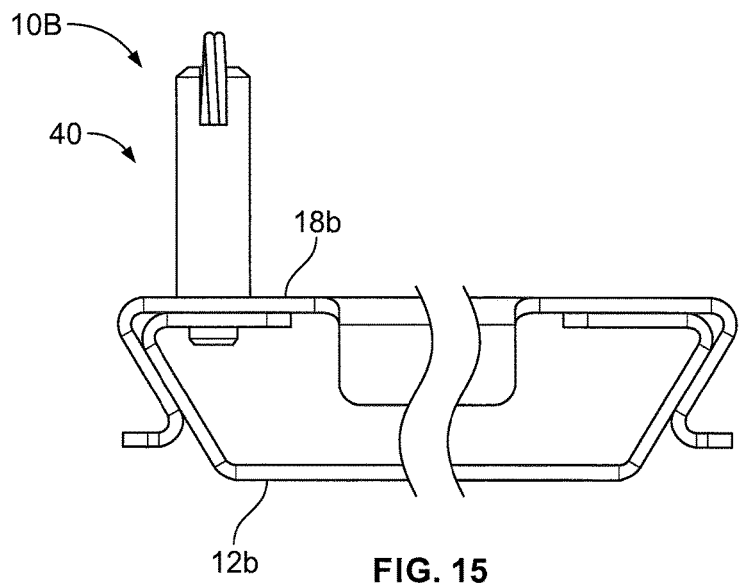
FIG. 15 is an end view of a mounting alignment apparatus utilizing a pin tension adjustment assembly, according to an example embodiment.

In some embodiments, the tension adjustment assembly may include a pin extending through an opening in the slide assembly and one or more openings in the rail assembly. For example, and referring also to FIGS. 14-16, another illustrative example embodiment of a mounting alignment apparatus 10B is shown. As shown in FIGS. 14A-14B, in a similar manner as the previously described embodiments, a rail assembly 12b and a slide assembly 18b may include a first and second pair of interacting alignment surfaces providing a capturing geometry, e.g., which may generally allow the slide assembly 18b and the rail assembly 12b to slide relative to one another along a first axis 24, which resisting other movements relative to one another. In the depicted embodiment, a pin 40 may be associated with the slide assembly 18b, and may be received in one or more openings (e.g., openings 42a-42b) formed in the rail assembly 12b. As shown, the one or more openings 42a-42b may extend along the first axis 24 and may be configured to receive at least a portion of the pin to retain the rail assembly 12b and the slide assembly 18b relative to one another in one or more positions along the first axis It will be appreciated that a plurality of openings may be provided in the rail assembly 12b along the first axis 24, thereby providing a plurality of positions in which the slide assembly 18b may be retained relative to the rail assembly 12b. The openings in the rail assembly may include, for example, holes, cutouts, notches, or the like, which may be capable of receiving at least a portion of the pin 40.

Figure 16:
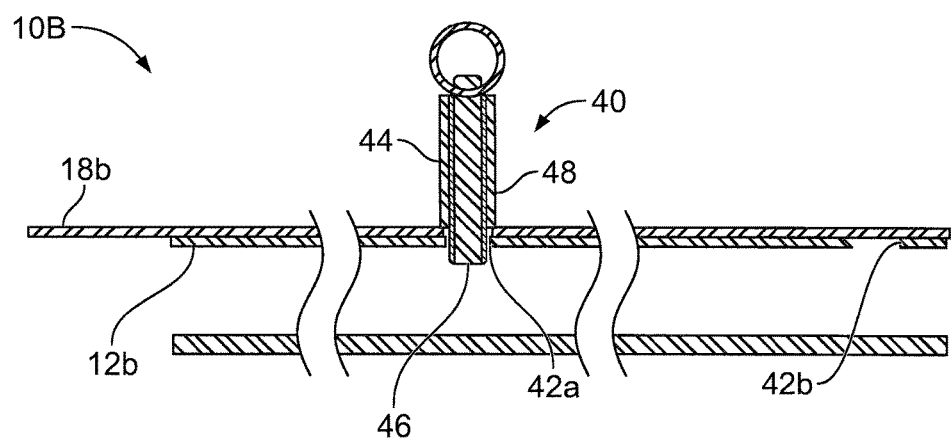
FIG. 16 is a detailed view of a mounting alignment apparatus utilizing a pin tension adjustment assembly, according to an example embodiment.

In an embodiment, the pin 40 may include a spring loaded pin biasing the pin toward engagement with the one or more openings in the rail assembly. For example, as shown in FIG. 16, the pin 40 may include a pin sleeve 44, with a pin plunger 46 slidingly received therein. Further, a spring 48 may be disposed between the pin sleeve 44 and the pin plunger 46, which may bias the pin plunger 46 toward engagement with the one or more openings in the rail assembly 12b. In such an embodiment, the pin plunger 46 may be withdrawn against the force of the spring 48, and the slide assembly 18b may be moved relative to the rail assembly 12b. When the pin 40 reaches alignment with one of the openings 42a-b in the rail assembly 12b, the biasing force of the spring 48 may urge the pin plunger 46 into the opening. It will be appreciated that a variety of additional and/or alternative arrangements may be utilizes. In general any releasable fastening mechanism that may releasably secure the rail assembly and the slide assembly in one or more predetermined and/or continuously variable positions relative to one another may be utilized. Examples of such mechanisms may include, but are not limited to, friction fasteners, detent pins, removable bolts (with or without cooperating nut), as well as various other mechanisms.

In a similar manner as discussed above, in various embodiments, the pin-based tension adjustment assembly may be generally centrally oriented relative to the first and second pairs of alignment surfaces. In some embodiments, a separate pin-based tension adjustment assembly may be disposed toward either edge of mounting alignment apparatus, and/or a single pin-based tension adjustment assembly may be offset relative to the first and second pairs of alignment surfaces (e.g., a single pin-based tension adjustment assembly may be disposed adjacent one edge of the mounting alignment apparatus).

Figure 17:
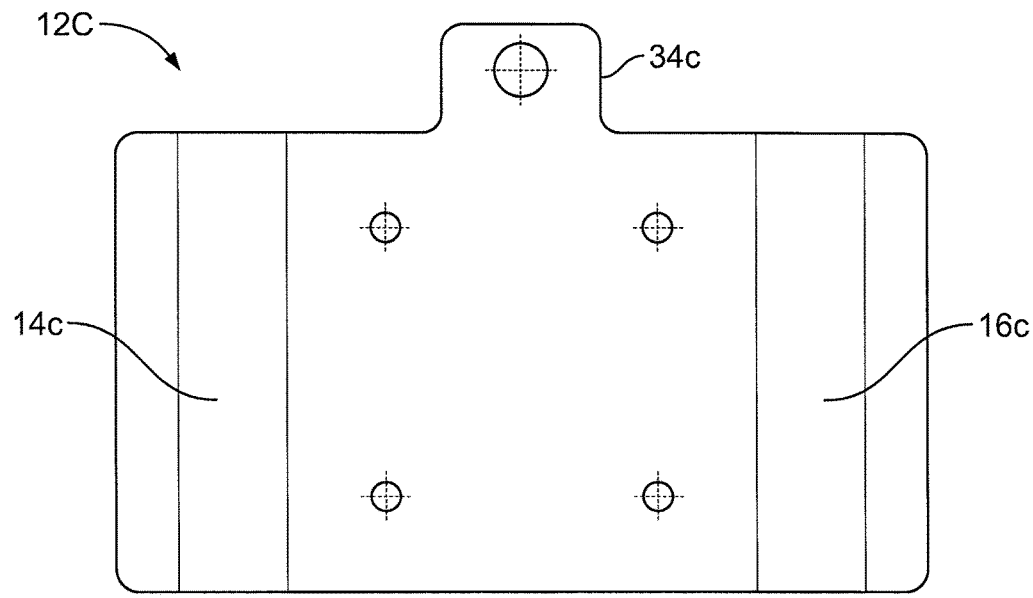
FIG. 17 is a top plan view of a sheet metal blank that may be used to form the example embodiment of the rail assembly of FIG. 4.
Figure 18:
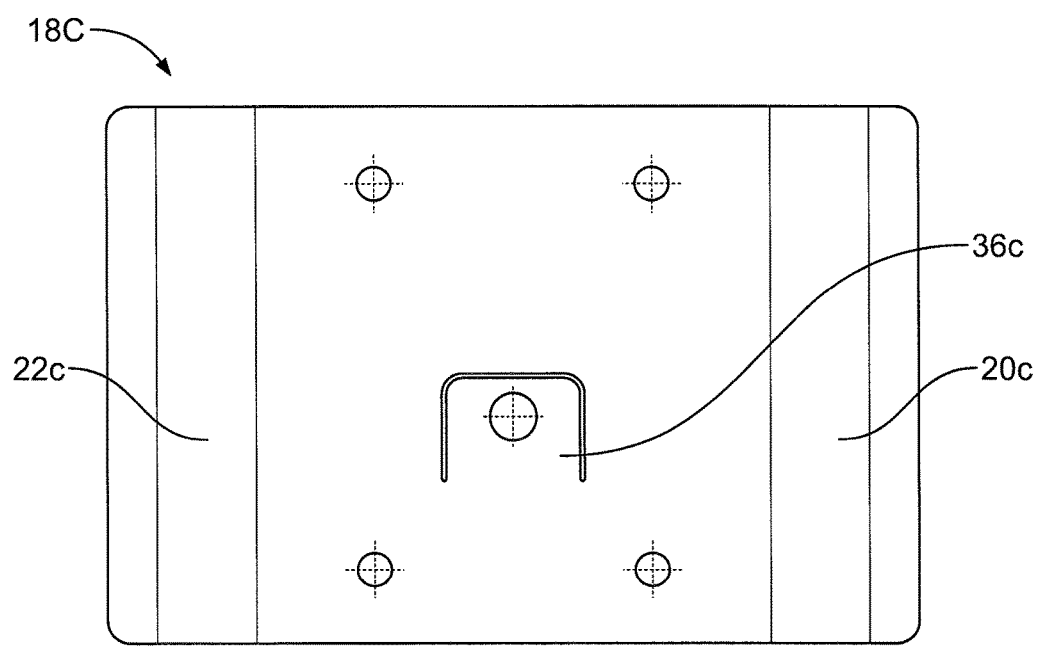
FIG. 18 is a top plan view of a sheet metal blank that may be used to form the example embodiment of a slide assembly of FIG. 6.

It will be appreciated that a variety of techniques may be utilized to produce the alignment mounting apparatus disclosed herein. In one example embodiment, one or more of the rail assembly and the slide assembly may include stamped sheet metal components. For example, and referring to FIGS. 17 and 18, illustrative examples of sheet metal blanks 12c and 18c for forming the rail assembly and the slide assembly, respectively, are shown. As depicted the sheet metal blanks 12c 18c may include the respective first and second pairs of alignment surfaces 14c, 16c, 20c, 22c, and tabs 34c, 36c, which may be stamped to achieved the final desired geometry (e.g., as generally shown in FIGS. 1-7). It will be appreciated that various additional and/or alternative processes may be utilized for producing the components of the alignment mounting apparatus, such as machining, casting, forging, and the like. It will be appreciated that any suitable techniques may be used for manufacturing and/or assembling the various components of the mounting alignment apparatus may be utilized.

Figure 19:
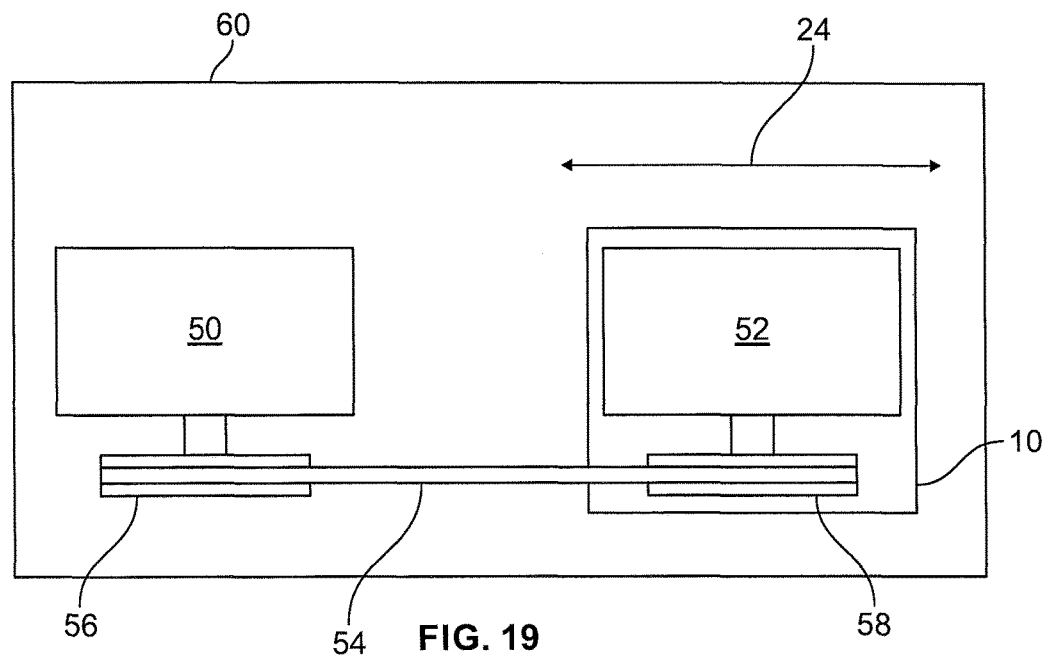
FIG. 19 is a top plan view of a system of belt driven machines utilizing a mounting alignment apparatus, according to an example embodiment.
Figure 20:
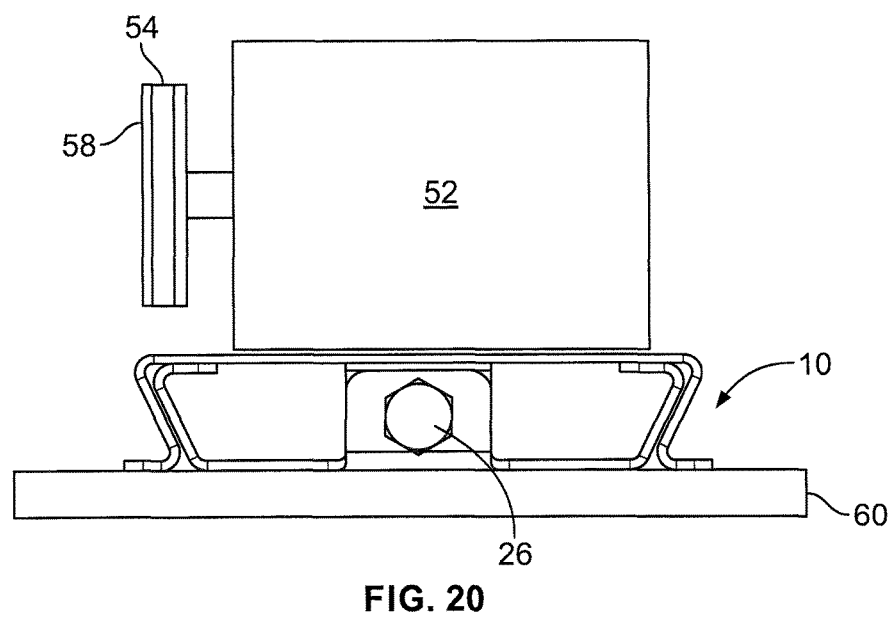
FIG. 20 is a right side view of the system of FIG. 19.

Referring to FIGS. 19 and 20, a system is shown including a first belt driven machine 50 and a second belt driven machine 52, coupled via a belt 54, e.g., for transmitting a driving force between the respective pulleys 56, 58 of the first and second belt driven machines 50, 52. In the illustrated embodiment, the first belt driven machine may be attached to a mounting structure, or frame, 60 by any suitable arrangement (e.g., bolting, welding, clamps, etc.). Further, the second belt driven machine 52 may be attached to a mounting alignment apparatus 10, which may, itself, be attached to the mounting structure, or frame, 60 by any suitable arrangement. As described above, the mounting alignment apparatus 10 may allow the second belt driven machine 52 to be slidingly positional along axis 24 (e.g., which may be parallel to the plane of the pulleys 56, 58), while resisting other movement. As such, and in a manner described above, the mounting alignment apparatus 10 may allow tension of the belt 54 between the first and second belt driven machines 50, 52 to be adjusted, e.g., by slidingly moving the second belt driven machine 52 relative to the first belt driven machine 50. For example, the bolt 26 of the mounting alignment apparatus 10 may tightened or loosened to increase or decrease the tension on the belt 54. While the first belt driven machine 50 has been shown attached to the mounting structure, or frame, 60, it will be appreciated that in some embodiments, the first belt driven machine 50 may also be attached to another mounting alignment apparatus. Further, in some such embodiments, the orientation of the mounting alignment apparatus to which the first belt driven machine 50 is attached may be angled such that the axis of the other mounting alignment apparatus is different than the first axis 24 of the mounting alignment apparatus to which the second belt driven machine 52 is attached. For example, the axes of the two mounting alignment apparatuses may be perpendicular, e.g., to allow the tension of the belt 54 to be adjusted, and to allow the alignment of the two pulleys 56, 58 to be adjusted (e.g., to adjust the planarity of the pulleys 56, 58). It will be appreciated that other configurations may also be implemented.

Figure 21:
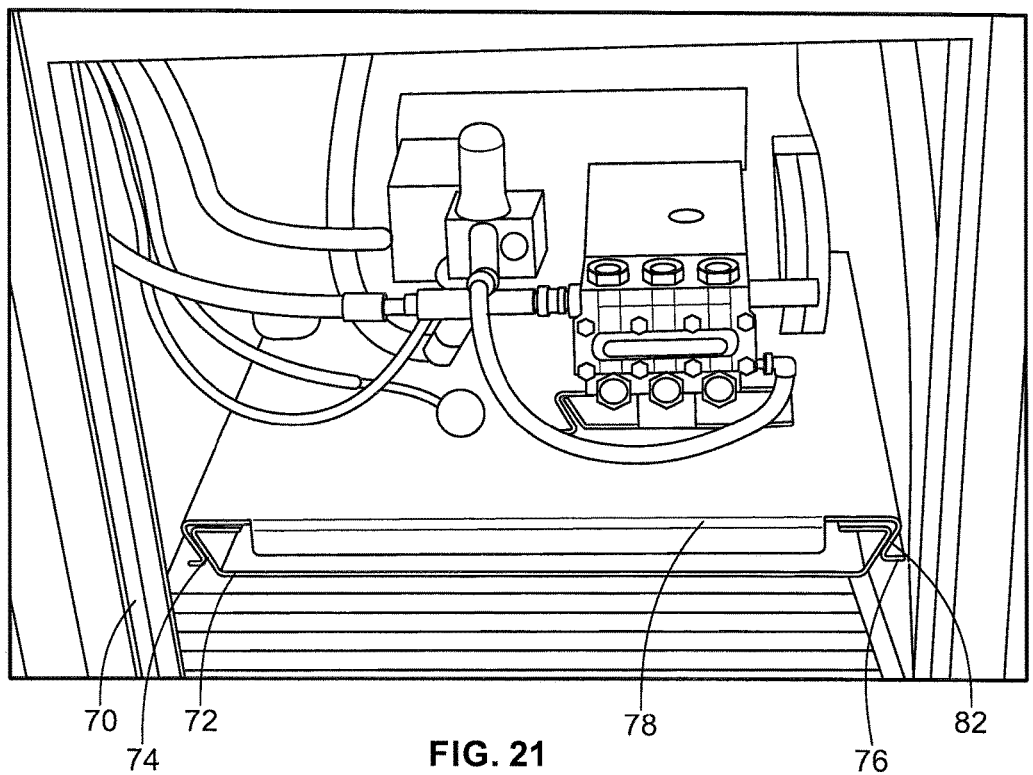
FIG. 21 is a detailed view of a cabinet incorporation a sliding shelf including interacting capturing geometry slides, according to an example embodiment.
Figure 22:
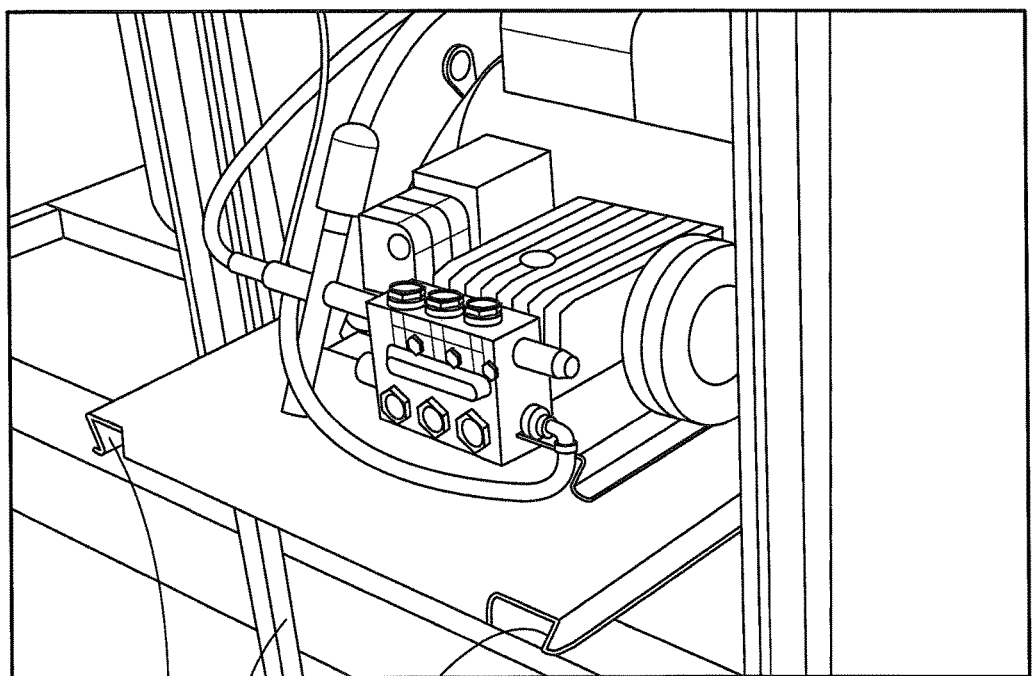
FIG. 22 is a detailed view of the cabinet with the shelf in an extended configuration.

Referring to FIGS. 21-22, an example of a system implementing alignment surfaces having an interacting capturing geometry, in a similar manner as discussed above, is shown.

For example, as shown, a system may include a frame 70. A rail assembly 72 may be attached to the frame 70. The rail assembly comprising a first pair of alignment surfaces 74, 76. A slide assembly 78 may include a second pair of alignment surfaces 80, 82. The first and second pairs of alignment surfaces 74, 76, 80, 82 may define an interacting capturing geometry therebetween permitting sliding movement of the slide assembly 78 relative to the rail assembly 72 along a first axis, and restricting movement of the slide assembly 78 relative to the rail assembly 72 about an axis other than the first axis.

In some implementations, the first pair of alignment surfaces 74, 76 may include a two opposed upwardly diverging sidewalls. The second pair of alignment surfaces 80, 82 may include two opposed downwardly converging sidewalls disposed proximate to, and outside of, the first pair of alignment surfaces 74, 76. In a particular embodiment, the frame 70 may include a cabinet, and the first axis may be perpendicular to a plane of a face of the cabinet 70. It will be appreciated that various alternative embodiments may be equally utilized, keeping with the principles described herein above with reference to the various features of the described mounting alignment apparatuses.

A variety of features of the mounting alignment system have been described. However, it will be appreciated that various additional features and structures may be implemented in connection with a mounting alignment system according to the present disclosure. As such, the features and attributes described herein should be construed as a limitation on the present disclosure.

What is claimed is:

1. A mounting alignment apparatus comprising:
   a rail assembly comprising a first pair of alignment surfaces including two opposed upwardly diverging sidewalls, each upwardly diverging sidewall including an inwardly turned edge portion;
   a slide assembly comprising a body portion including a second pair of alignment surfaces including two opposed downwardly converging sidewalls disposed proximate to, and outside of, the first pair of alignment surfaces, the first and second pairs of alignment surfaces defining an interacting capturing geometry therebetween permitting sliding movement of the slide assembly relative to the rail assembly along a first axis, and restricting movement of the slide assembly relative to the rail assembly about an axis other than the first axis, and each inwardly turned edge portion of the first pair of alignment surfaces generally parallel with, and disposed proximate to and underside of the body portion;
   a tension adjustment assembly coupled between the rail assembly and the slide assembly for positioning the slide assembly relative to the rail assembly along the first axis.

2. The mounting alignment apparatus of claim 1, wherein one of the first pair of alignment surfaces and the second pair of alignment surfaces define a channel extending along the first axis, and wherein the other of the first pair of alignment surfaces and the second pair of alignment surfaces define a protrusion extending into the channel.

3. The mounting alignment apparatus of claim 1, wherein the tension adjustment assembly includes a threaded nut engaged with one of the rail assembly and the slide assembly and a threaded rod engaged with the other of the rail assembly and the slide assembly, the threaded rod threadably engageable with the nut to move the rail assembly and the slide assembly relative to one another upon rotation of at least one of the threaded nut and the threaded rod.

4. The mounting alignment apparatus of claim 3, wherein the threaded rod includes a bolt received through an upstanding tab of the rail assembly and the threaded nut is coupled to a downwardly extending tab of the slide assembly.

5. The mounting alignment apparatus of claim 3, wherein the nut includes a locking nut.

6. The mounting alignment apparatus of claim 1, wherein the tension adjustment assembly includes a pin extending through an opening in the slide assembly and one or more openings in the rail assembly, the one or more openings along the first axis and configured to receive at least a portion of the pin to retain the rail assembly and the slide assembly relative to one another in one or more positions along the first axis.

7. The mounting alignment apparatus of claim 6, wherein the pin includes a spring loaded pin biasing the pin toward engagement with the one or more openings in the rail assembly.

8. The mounting alignment apparatus of claim 1, wherein one or more of the rail assembly and the slide assembly include stamped sheet metal components.

9. The mounting alignment apparatus of claim 1, wherein the tension adjustment assembly is generally centrally oriented relative to the first and second pairs of alignment surfaces.

10. The mounting alignment apparatus of claim 1, wherein the tension adjustment assembly is offset relative to the first and second pairs of alignment surfaces.

11. The mounting alignment apparatus of claim 1, wherein the frame assembly includes a cabinet, and wherein the first axis is perpendicular to a plane of a face of the cabinet.

12. The mounting apparatus of claim 1, wherein each of the second pair of alignment surfaces includes an outwardly turned edge portion, each outwardly turned edge portion configured to be generally parallel with, and disposed proximate to, a top surface of a mounting structure for the rail assembly.

13. A system comprising:
    a support frame;
    a first belt driven machine mounted to the support frame, the first belt driven machine including a first pulley;
    a second belt driven machine mounted to a mounting alignment apparatus, the second belt driven machine including a second pulley rotatably coupled to the first pulley by a belt, the mounting alignment apparatus comprising:
       a rail assembly comprising a first pair of alignment surfaces including two opposed upwardly diverging sidewalls, each upwardly diverging sidewall including an inwardly turned edge portion;
       a slide assembly comprising a body portion mounting the second belt driven machine and including a second pair of alignment surfaces including two opposed downwardly converging sidewalls disposed proximate to, and outside of, the first pair of alignment surfaces, the first and second pairs of alignment surfaces defining an interacting capturing geometry therebetween permitting sliding movement of the slide assembly relative to the rail assembly along a first axis parallel to a plane of the belt, and restricting movement of the slide assembly relative to the rail assembly about an axis other than the first axis, and each inwardly turned edge portion of the first pair of alignment surfaces generally parallel with, and disposed proximate to an underside of the body portion;
a tension adjustment assembly coupled between the rail assembly and the slide assembly for adjusting a tension of the belt by positioning the slide assembly relative to the rail assembly along the first axis.

14. The system according to claim 13, wherein the first belt driven machine includes a prime mover and the second belt driven machine includes a belt driven accessory receiving driving power from the prime mover via the belt.

15. The system according to claim 14, wherein the second belt driven machine includes a pump.

16. The system according to claim 13, wherein the tension adjustment includes a bolt extending through an upstanding tab of the rail assembly and threadably engaging a locking nut affixed to a downwardly extending tab of the slide assembly.

17. The system according to claim 13, wherein the first and second pairs of alignment surfaces define complimentary interacting capturing geometries.

18. The system according to claim 13, wherein the rail assembly of the mounting alignment apparatus is mounted to the support frame, and wherein each of the second pair of alignment surfaces includes an outwardly turned edge portion, each outwardly turned edge portion configured to be generally parallel with, and disposed proximate to, a top surface of the support frame.

19. A system comprising:
a frame assembly;
a rail assembly attached to the frame assembly, the rail assembly comprising a first pair of alignment surfaces including two opposed upwardly diverging sidewalls, each upwardly diverging sidewall including an inwardly turned edge portion; and
a slide assembly comprising a body portion including a second pair of alignment surfaces including two opposed downwardly converging sidewalls disposed proximate to, and outside of, the first pair of alignment surfaces, the first and second pairs of alignment surfaces defining an interacting capturing geometry therebetween permitting sliding movement of the slide assembly relative to the rail assembly along a first axis, and restricting movement of the slide assembly relative to the rail assembly about an axis other than the first axis, and each inwardly turned edge portion of the first pair of alignment surfaces generally parallel with, and disposed proximate to an and underside of the body portion.

20. The system of claim 19, wherein each of the second pair of alignment surfaces includes an outwardly turned edge portion, each outwardly turned edge portion being generally parallel with, and disposed proximate to, a surface of the frame assembly to which the rail assembly is attached.

* * * * *